$\theta = \dfrac{\pi}{2} - \dfrac{\Theta}{2}$

INVENTOR.
Robert Adler

United States Patent Office 3,373,380
Patented Mar. 12, 1968

3,373,380
LASER BEAM-SOUNDWAVE TECHNIQUES USING CURVED ACOUSTIC WAVES
Robert Adler, Northfield, Ill., assignor to Zenith Radio Corporation, Chicago, Ill., a corporation of Delaware
Continuation-in-part of application Ser. No. 388,589, Aug. 10, 1964. This application Aug. 3, 1965, Ser. No. 476,873
11 Claims. (Cl. 332—7.51)

This application is a continuation-in-part of my copending application Ser. No. 388,589, filed Aug. 10, 1964, and assigned to the same assignee. As in that case, the present application pertains generally to signal translating apparatus and more particularly relates to systems and apparatus in which sound and light are caused to interact. As used herein, the terms "light" and "sound" are most general. That is, the term light refers to both visible and invisible electromagnetic radiation and embraces wave energy at wavelengths either within, above or below the visible portion of the spectrum. The term "sound" also refers to propagating wave energy and includes not only that in the audible range but that up to and including, for example, microwave frequencies.

In the aforementioned parent application, light waves are caused to be diffracted by sound waves, as a result of which the light waves are deflected to a particular angle or angles depending upon the frequency characteristics of the sound waves. The sound waves are modulated either in amplitude or frequency as the particular application requires. One advantageous arrangement described in the parent application projects the sound wave-fronts across the light wave-fronts so that the angle therebetween is in accordance with the relationship of Bragg. With that angular relationship, the traveling sound waves act as if they were moving mirrors and, for a given frequency relationship, the angles of incidence and refraction of the light are the same as in the case with an ordinary mirror. With planar sound and light wave-fronts, usable Bragg angle reflection is attainable only over a limited range of sound frequencies without readjustment of the relative beam positions so as to maintain the Bragg relationship. In contemplation of scanning or changing the sound frequency over a wider range of frequencies, the parent application specifically embodies means for physically changing the relative orientations of the elements with changes in sound frequency.

It is a general object of the present invention to provide light-sound-interaction signal-translating apparatus which maintains proper angular relationships between the light and sound waves in a manner either reducing or eliminating the need for physical repositioning of any of the elements in the apparatus.

Another object of the present invention is to provide signal translating apparatus of the aforementioned type in which the sound frequency may be scanned over a substantial frequency range without undue loss of efficiency.

It is a still further object of the present invention to achieve the foregoing with apparatus which features simplicity of construction and of operational requirements.

Signal translating apparatus according to the present invention includes means for producing a beam containing wave-fronts of spatially coherent monochromatic light together with means for directing sound-wave-fronts across the path of that beam. At least a portion of one of the wave-fronts is curved and the direction of propagation of the sound is oriented relative to that of the light so that the tangents to the curved portion include a tangent which intersects the other of the wave-fronts at the Bragg angle corresponding to the wavelengths of the sound and light.

The features of the present invention which are believed to be novel are set forth with particularity in the appended claims. The organization and manner of operation of the invention, together with further objects and advantages thereof, may best be understood by reference to the following description taken in conjunction with the accompanying drawing, in the several figures of which like reference numerals identify like elements and in which:

Figure 1:
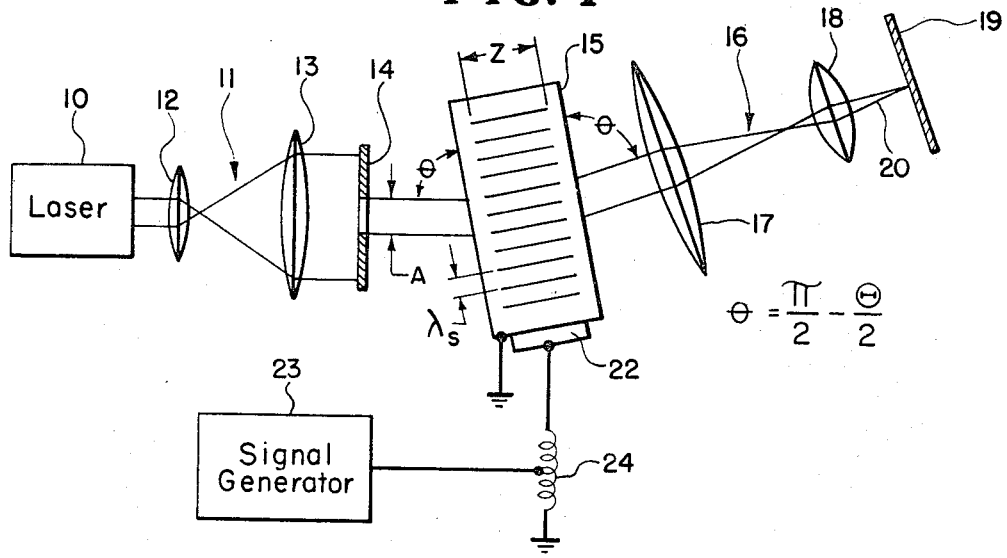
FIGURE 1 is a schematic diagram of a light-sound signal-translating apparatus.

The system depicted in FIGURE 1 is basically the same as that described and claimed in the parent application and is included here to facilitate understanding. The apparatus includes a source 10 of spatially coherent substantially monochromatic light, a magnifying telescope 11 having an eye-piece 12 and an object lens 13, a beam-limiting aperture-plate 14 with an aperture width A, a light-sound interaction cell 15, an inverted-telescope 16 having an object lens 17 and an eye-piece 18, and, in this illustration, a light-responsive screen 19 across which light beam 20 is scanned.

In one example, cell 15 is a container the walls of which are transmissive to the light waves and which is filled with water as the sound propagating medium. At one end of cell 15, coupled to the water, is a transducer 22 driven by electrical signals from a signal generator 23 suitably matched to transducer 22 by a transformer 24. As illustrated, transducer 22 generates planar wave-fronts.

With the apparatus of FIGURE 1, Bragg reflection is obtained when the light, of vacuum wavelength $\lambda$, travels in a stratified medium of spatial period $\Lambda$ and refractive coefficient $n$ through a path length $Z$ such that:

$$Z \gg n\Lambda^2/\lambda \tag{1}$$

The diffracted light forms a diffraction angle $\Theta$ with the undiffracted light according to:

$$\sin \frac{\Theta}{2} = \frac{1}{2}\frac{\lambda}{\Lambda} \tag{2}$$

where $\Theta \ll 1$, $\Theta \cong \lambda/\Lambda$. The Bragg angle may be defined in terms of the angle $\theta$ between the light and sound wave-fronts; in that case the function in Equation 2 is more directly expressed in terms of cosine instead of sine. Since $\theta$ is the complement $\pi/2 - \Theta/2$, the left hand term in Equation 2 becomes $\cos \theta$. Angle $\theta$ also is the angle between the propagation directions of the diffracted light and the sound beam. To obtain optimum intensity, the strata are oriented like mirrors, symmetrical to the incident and diffracted light. However, that precise orientation affects only the intensity, not the direction, of the diffracted light.

When the strata are generated by a sound wave of phase velocity $v$, the wavelength $\Lambda$ for an applied frequency $f$ is $\Lambda = v/f$ and the diffraction angle $\Theta = \lambda f/v$. If the sound frequency is varied over a range $\Delta f$, the resulting scanning angle $\Delta \Theta = \lambda(\Delta f)/v$.

The minimum angle which a projection system of aperture width $A$ can resolve is $\Theta_{min} = \lambda/A$. Dividing the scanning angle $\Delta\Theta$ by this minimum angle, the number $N$ of resolvable spots is found to be:

$$N = \Delta\Theta/\Theta_{min} = (\Delta f)A/v \qquad (3)$$

$A$ is the aperture width measured at approximately right angles to the sound wave-fronts, i.e., along the direction of sound travel. It will be seen that $A/v$ is the transit time $T$ of the sound waves across the aperture. Thus:

$$N = (\Delta f)T \qquad (4)$$

To gain a fuller grasp of the parameters involved, one successful embodiment of FIGURE 1 will be considered in more detail. The change of sound frequency $\Delta f$ is chosen to be $5 \times 10^6$ cycles per second and aperture width $A$ is 22 millimeters. Since the sound velocity $v$ in water is $1.5 \times 10^6$ millimeters per second, the transit time calculates to be 14.7 microseconds and the number of resolvable points $N$ in accordance with the foregoing relationship to be 73.5. The 1.5 millimeter wide beam from a helium-neon laser operating at 6328 A. is expanded to a width of about 30 millimeters by telescope 11 which has a magnification of 21 times. Aperture plate 14 allows a light beam width $A$ of 22 millimeters as the light enters cell 15. Transducer 22 is a quartz crystal 15 millimeters wide (the path length $Z$) and 3 millimeters high.

At the selected average frequency of 42.5 megacycles per second, the difffraction angle $\Theta$ is 18 milliradians. Cell 15 is tilted by half this amount to obtain optimum Bragg reflection. Inserting the selected parameters ($n = 1.33$, $\Lambda = 3.53 \times 10^{-2}$ millimeters, $\lambda = 6.33 \times 10^{-4}$ millimeters) into the criteria set forth above, it is found that $n\Lambda^2/\lambda$ is 2.65 millimeters; a light path $Z$ of 15 millimeters is therefore of sufficient length to insure operation in the Bragg region.

The electrical power applied to transducer 22 is 200 milliwatts; the transducer is matched to the output of signal generator 23 by transformer 24 which is tuned in the range from 40 to 45 megacycles per second. The incident light is restricted by the rectangular aperture to 3 millimeters in height, so that no light can bypass the sound wave. The intensity of the diffracted light entering inverted telescope 16 is found to be 8 db below that of the undiffracted light entering cell 15.

On leaving cell 15, the diffracted light is projected through inverted telescope 16 which magnifies all angles 14.4 times. Consequently, the observed difffraction angle $\Theta'$, according to calculation, is 260 milliradians. Similarly, the scanning angle $\Delta\Theta$, which without inverted telescope 16 computes to be 2.11 milliradians corresponding to a frequency change $\Delta f$ of 5 megacycles per second, is increased to a value ($\Delta\Theta'$) of 30.4 milliradians. Also by virtue of the inclusion of inverted telescope 16, the minimum resolvable angle is increased from a value ($\Theta_{min} = \lambda/A$) of 0.029 milliradian to a value of 0.415 milliradian. In this particular system, light responsive screen 19 is in the form of a film spaced a distance $D$ of 1.5 meters from lens 18; the telescope is adjusted to focus the light on the film. The computations reveal a scanning pattern which occupies a space ($D \times \Delta\Theta'$) of 47.5 millimeters and a theoretical resolution of 0.65 millimeter.

To ascertain the actual resolution, the sound frequency $f$ is first changed in thirty equal steps of 167 kilocycles-per-second each as the film is exposed by the scanned light beam. The film upon development reveals a series of white lines of a width about equal to that of the dark spaces in between. A second film is then exposed utilizing approximately 60 steps each 83 kilocycles-per-second apart; the lines on this film are still clearly separated. It is found that the white lines tend to merge when the spacing is reduced to 70 steps each 71 kilocycles-per-second apart and they are no longer distinguishable with 83 steps each 60 kilocycles-per-second apart. Thus, the agreement with the calculated figure of resolution $n$ of 73.5 is extremely good.

In the aforedescribed operation, it may be noted that lines, instead of dots, appear on the exposed film because the aperture at right angles to the direction of scanning, corresponding to the height of transducer 22, is only 3 millimeters. This renders the vertical resolution almost one order of magnitude poorer than the horizontal. Where necessary this difference in resolution is eliminated by the use of cylindrical lenses in the projecting telescope 16.

The attenuation in water of sound in the 40 megacycle range is about 0.5 db/millimeter, or 11 db across the 22 millimeter aperture in the above-described system. When a light beam of uniform intensity and semi-infinite width traverses a sound wave of exponentially decreasing amplitude, the resolution of the diffracted light equals that which would be obtained with zero sound attenuation and a uniformly illuminated aperture $A_{eq}$; here, $A_{eq}$ is the distance in which the sound power is attenuated by $2\pi$ nepers (27 db). In that system, $A_{eq}$ is about 55 millimeters. Consequently, the resolution obtained is predominantly determined by the physical aperture. A beam with a Gaussian intensity distribution suffers no loss of resolution. The effect of the exponential decay of sound amplitude across such a beam is merely that of displacing the center of the diffracted beam.

Theoretically, the sound cell in FIGURE 1 should be rotated by $\frac{1}{2} \Delta\Theta$ ($\pm \frac{1}{4} \Delta\Theta$) as the diffracted light is scanned over $\Delta\Theta$. For the above results, this is not necessary; the tolerance on the cell position can be shown to be about $\pm \frac{1}{2}\Lambda/Z$, extinction occurring at $\pm\Lambda/Z$. The value of $\frac{1}{2}\Lambda/Z$ is about 1.2 milliradians while $\frac{1}{4}\Delta\Theta$ is only 0.53 milliradian for $\Delta f = 5$ megacycles per second. In the example described, $\Delta f$ is limited by transducer bandwidth.

With improved transducer design, it is possible to obtain much larger scanning angles. A value for $\Delta f$ of 15 megacycles per second, for instance, produces 220 resolvable spots with aperture width $A$ unchanged. Such improvement, however, causes the scanning angle to exceed the above-mentioned tolerance range and thus forces a reduction in the length $Z$. This in turn calls for increased sound power to maintain the diffracted light at equal intensity.

Figure 2:
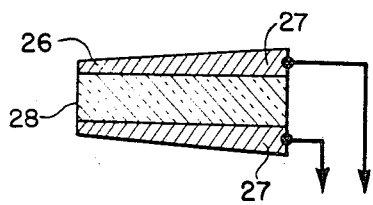
FIGURE 2 is a schematic representation of an element which may be utilized in FIGURE 1.

One way to increase the bandwidth of the transducer utilized in conjunction with cell 15 is to increase its thickness from one side to the other as illustrated in FIGURE 2. Either the thickness of the piezoelectric material or that of the sandwiching electrodes may be tapered. As illustrated, it is the thickness of electrodes 27, between which piezo electric element 28 is sandwiched, which is tapered. The increased mass of the transducer element as a whole toward the one side decreases its resonant frequency. That is, the tapering of the mass across the length of the transducer in the direction of light beam travel enables the transducer to exhibit a much greater width of frequency response.

In order to insure an appropriate Bragg relationship over a wide range of frequencies, at least a portion of one of the light and sound wave-fronts is curved and the direction of propagation of the sound waves relative to the light waves is such that the tangents to the curved portion include a tangent which intersects the other of the wave-fronts at the Bragg angle $\theta$ corresponding to the wavelengths of the sound and light. While a lens system for the light beam which develops curved light wave-fronts may be used, the improvement is preferably embodied by designing the transducer to produce curved sound wave-fronts so as to make a collection of angles available which include the proper Bragg angle. This is achieved at least over a significant frequency range by the simple expedient of constructing transducer 22 so that in operation it assumes a non-planar or warped contour. The warped surface of the transducer produces the curved sound wave-fronts.

One embodiment of this improved system, otherwise like FIGURE 1 but without the telescopes, utilizes an average sound frequency of 57 megacycles per second. Transducer 22 is an X-cut quartz crystal about 0.002 inch thick and has a cross-section 0.800 inch by 0.160 inch. It is not tapered in thickness but does warp in operation. The beam from the same laser as described above is directed through the water along the longer dimension of the crystal. By changing the sound frequency, the spot corresponding to the diffracted light is shifted laterally and substantially linearly in correspondence with the frequency change. In this case, the observed spot size corresponds approximately to 1 megacycle of frequency shift. Changing the signal frequency ±10 megacycles causes a deflection of the diffracted spot by about ⅓ of its distance from the undiffracted spot which also appears upon the light-reflective surface utilized in this case for observation.

Figure 3:
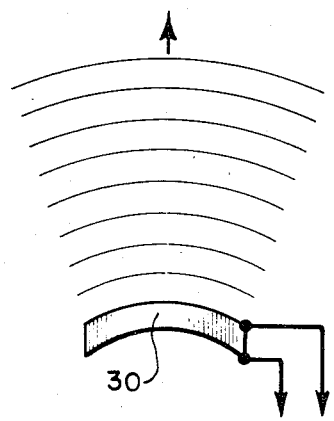
FIGURE 3 depicts one alternative to the element shown in FIGURE 2.

In accordance with another improvement, a uniform-thickness transducer 30 is selected to have a curved contour of at least its active sound-propagating surface, and perhaps most easily of both its front and back surfaces as illustrated for transducer 30 in FIGURE 3. The concentric wave-fronts thus produced include many tangents one of which intersects the light wave-fronts at the Bragg angle.

Figure 4:
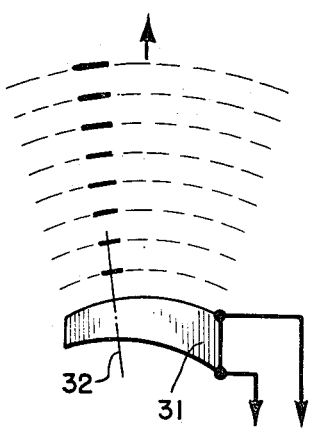
FIGURE 4 illustrates another alternative to the element depicted in FIGURE 2.

The advantages of both FIGURES 2 and 3 are combined in transducer 31 illustrated in FIGURE 4. In this instance, the transducer contour is both tapered and curved. The taper causes the point of maximum vibration to move as the frequency changes. By deliberately also curving the sound wave-front shape, the sound wave-fronts follow a path 32 of maximum power flow from the instantaneously active portion of transducer 31. This path changes direction relative to the light wave-fronts with change in sound frequency so that a tangent to the sound wave-fronts intersects the light wave-fronts at the Bragg angle $\theta$ corresponding to the wavelengths of the sound and the light. That is, the sound energy is concentrated as indicated by the solid lines and it is turned as the sound frequency changes.

Figure 5:
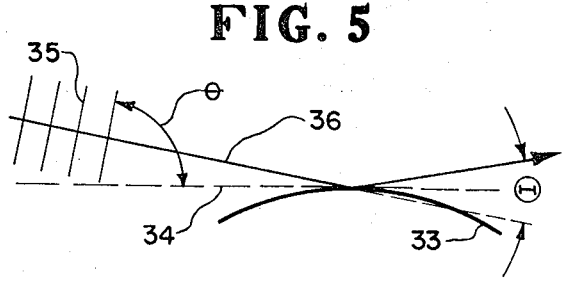
FIGURE 5 depicts certain orientational relationships useful in understanding the explanation of FIGURES 3 and 4.

FIGURE 5 illustrates the large number of resolvable tangents to curved wave-front 33. With respect to tangent 34, the light wave-fronts 35 follow a path 36 so oriented that wave-fronts 35 intersect tangent 34 at the Bragg angle $\theta$.

The basic mechanisms discussed above have numerous applications many of which were mentioned in some detail in the parent application. One most attractive application lies in the scanning of a light beam across a light-responsive screen for the purpose of image reproduction. The improvements made possible by the subject matter of the present application yield a significant increase, for example, in the scanning angles available with practical apparatus.

While particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. Signal translating apparatus comprising:
means for producing a beam containing wave-fronts of spatially coherent substantially monochromatic light;
and means for directing across the path of said beam sound wave-fronts, at least a portion of one of said wave-fronts being curved and the direction of propagation of said sound being oriented relative to that of said light so that the tangents to said portion include a tangent which intersects the other of said wave-fronts at the Bragg angle corresponding to the wavelengths of said sound and light.

2. Signal translating apparatus comprising:
means for producing a beam containing wave-fronts of spatially coherent substantially monochromatic light;
and means for directing across the path of said beam sound waves having wave-fronts at least a portion of which are curved, the direction of propagation of said sound being oriented relative to said beam so that the tangents to said sound wave-fronts include a tangent which intersects said light wave-fronts at the Bragg angle corresponding to the wavelengths of said sound and light waves.

3. Apparatus as defined in claim 2 in which said sound waves are generated by a transducer surface which in operation is warped relative to a planar condition.

4. Apparatus as defined in claim 2 in which said sound waves are generated by a transducer element having a thickness, in the direction of sound propagation, which increases from one side of the path of said wave-fronts to the other.

5. Apparatus as defined in claim 4 in which the surface of said transducer which develops said sound waves is curved.

6. Apparatus as defined in claim 2 in which said sound waves are generated by a transducer surface which is curved in contour.

7. Signal translating apparatus comprising:
means for producing a beam containing wave-fronts of spatially coherent substantially monochromatic light;
means for directing across the path of said beam sound waves having wave-fronts at least a portion of which are curved, the direction of propagation of said sound being oriented relative to said beam so that the tangents to said sound wave-fronts include a tangent which intersects said light wave-fronts at the Bragg angle corresponding to the wavelengths of said sound and light waves;
and means for varying the frequency of said sound.

8. Signal translating apparatus comprising:
means for producing a beam containing wave-fronts of spatially coherent substantially monochromatic light;
means for directing across the path of said beam sound waves having wave-fronts at least a portion of which are curved, the direction of propagation of said sound being oriented relative to said beam so that the tangents to said sound wave-fronts include a tangent which intersects said light wave-fronts at the Bragg angle corresponding to the wavelengths of said sound and light waves;
and means for repetitively scanning the frequency of said sound through a selected range of frequencies.

9. Signal translating apparatus comprising:
means for producing a beam containing wave-fronts of spatially coherent substantially monochromatic light;
means for directing across the path of said beam sound waves having wave-fronts at least a portion of which are curved, the direction of propagation of said sound being oriented relative to said beam so that the tangents to said sound wave-fronts include a tangent which intersects said light wave-fronts at the Bragg angle corresponding to the wavelengths of said sound and light waves;
and means for varying the frequency of said sound over a selected range of frequencies throughout which progressively different tangents to said sound wave-fronts intersect said light wave-fronts substantially at said Bragg angle.

10. Signal translating apparatus comprising:
means for producing a beam containing waves of spatially coherent substantially monochromatic light;
means for producing sound having a direction of maximum power flow which changes with change in the sound frequency and for directing said sound across the path of said light with an orientation thereto such that said direction changes over a range of the sound frequencies to maintain the intersection of said light and sound substantially at the Bragg angle corresponding to the wavelengths of said sound and light.

11. Apparatus according to claim 10 in which said sound producing means is a transducer having a curved sound developing surface across which the region of maximum vibration travels in response to change in the frequency of said sound.

References Cited

UNITED STATES PATENTS 2,449,166    9/1948    Hershberger ........ 350—160

ROY LAKE, *Primary Examiner.*

D. M. HOSTETTER, *Assistant Examiner.*